(12) United States Patent
Shinohara et al.

(10) Patent No.: US 12,732,843 B2
(45) Date of Patent: Sep. 8, 2026

(54) FREQUENCY SITUATION OBSERVATION SYSTEM, FREQUENCY SITUATION OBSERVATION METHOD, AND DATA ARITHMETIC DEVICE

(71) Applicant: NTT, Inc., Tokyo (JP)

(72) Inventors: Shoko Shinohara, Musashino (JP); Yusuke Asai, Musashino (JP); Yasushi Takatori, Musashino (JP); Junichi Iwatani, Musashino (JP); Yoshitaka Shimizu, Musashino (JP); Tomoyuki Yamada, Musashino (JP)

(73) Assignee: NTT, Inc., Tokyo (JP)

( * ) Notice: Subject to any disclaimer, the term of this patent is extended or adjusted under 35 U.S.C. 154(b) by 323 days.

(21) Appl. No.: 18/708,034

(22) PCT Filed: Nov. 19, 2021

(86) PCT No.: PCT/JP2021/042639
§ 371 (c)(1),
(2) Date: May 7, 2024

(87) PCT Pub. No.: WO2023/089779
PCT Pub. Date: May 25, 2023

(65) Prior Publication Data
US 2025/0039707 A1 Jan. 30, 2025

(51) Int. Cl.
*H04W 24/08* (2009.01)
*H04W 84/12* (2009.01)

(52) U.S. Cl.
CPC ............ *H04W 24/08* (2013.01); *H04W 84/12* (2013.01)

(58) Field of Classification Search
CPC ...... H04W 24/08; H04W 84/12; H04W 16/18
See application file for complete search history.

(56) References Cited

U.S. PATENT DOCUMENTS

2016/0316422 A1* 10/2016 Regan .................. H04W 24/02
2026/0105016 A1* 4/2026 Reardon ............. G06F 13/4022

OTHER PUBLICATIONS kawamitu.co.jp [online] "Ekahau Pro: Site survey," available on or before Nov. 2021, retrieved on Nov. 2021, retrieved from URL<https://www.kawamitu.co.jp/application/files/5815/7588/2201/pdf-002.pdf>, 13 pages (with machine translation).
toyo.co.jp [online], "AirMagnet Survey," available on or before Nov. 2021, retrieved on Nov. 2021, retrieved from URL<https://www.toyo.co.jp/files/user/img/product/ict/pdf/Surveyor_User Guide86.pdf>, 51 pages (with machine translation).

* cited by examiner

*Primary Examiner* — Shawn D Miller
(74) *Attorney, Agent, or Firm* — Fish & Richardson P.C.

(57) ABSTRACT

A frequency state observation system observes a spectrum in a predetermined frequency range by a plurality of observation devices that are arranged in advance at different positions in a predetermined area, performs wireless communication in the predetermined frequency range, receives, by a data calculation device, the spectrum and packet information from each of the plurality of observation devices together with each of time information, synchronizes each of spectra received by the data calculation device based on time information of packet information corresponding to the spectra, and determines usage of a frequency in the predetermined area or the type of a wireless system transmitting a radio wave in the predetermined area, on the basis of each of the synchronized spectra.

8 Claims, 5 Drawing Sheets

FROM EACH OBSERVATION DEVICE 2
3
31
RECEPTION UNIT
32
SYNCHRONIZATION PROCESSING UNIT
33
330
USAGE DETERMINATION UNIT
332
WIRELESS SYSTEM DETERMINATION UNIT
34
POSITION ESTIMATION UNIT
30
STORAGE UNIT
35
GENERATION UNIT

FREQUENCY SITUATION OBSERVATION SYSTEM, FREQUENCY SITUATION OBSERVATION METHOD, AND DATA ARITHMETIC DEVICE

CROSS-REFERENCE TO RELATED APPLICATIONS

This application is a National Stage application under 35 U.S.C. § 371 of International Application No. PCT/JP2021/042639, having an International Filing Date of Nov. 19, 2021. The disclosure of the prior application is considered part of the disclosure of this application, and is incorporated by reference in its entirety into this application.

TECHNICAL FIELD

The present invention relates to a frequency state observation system, a frequency state observation method, and a data calculation device.

BACKGROUND ART

With the increasing importance of wireless communications, there are more and more cases where numerous wireless communication systems coexist in a license-free band, transmitting signals while interfering with each other. In this case, in order to construct an optimum communication environment, station placement and channel selection are important. In addition, station placement and channel selection need to take interference into consideration.

Conventionally, a site survey has been known as a method for observing the usage of surrounding channels (see, for example, NPL 1 and 2). In the site survey, the measuring instrument is moved in an area where the radio wave usage is to be observed, and a heat map is created from the observation results of a plurality of points. In a site survey tool such as a wireless LAN, a wireless LAN signal is demodulated to evaluate the area and throughput of the wireless LAN.

CITATION LIST

Non Patent Literature

[NPL 1] "AirMagnet Survey," Fluke Electronics Corporation, [online], Internet <URL:https://www.toyo.co.jp/files/user/img/product/ict/pdf/Surveyor_User_Guide86.pdf>

[NPL 2] "Ekahau Pro: Site survey," Ekahau, [online], Internet <URL:https://www.kawamitu.co.jp/application/files/5815/7588/2201/pdf-002.pdf>

SUMMARY OF INVENTION

Technical Problem

However, in the case of performing site survey to grasp interference of radio waves, if a plurality of wireless communication systems coexist in addition to a specific wireless communication system such as a wireless LAN, the investigation of the wireless LAN signal is insufficient.

In addition, if the target area is large, a site survey that observes a plurality of locations while moving from one location to another takes time, and the radio wave usage may have changed. Therefore, there is a problem that accurate measurement of the radio wave usage becomes difficult.

The present invention has been made in view of the above-mentioned problems, and an object thereof is to provide a frequency state observation system, a frequency state observation method, and a data calculation device that enable accurate observation of a frequency state even when a plurality of wireless communication systems coexist in a predetermined area.

Solution to Problem

A frequency state observation system according to one embodiment of the present invention includes: a plurality of observation devices that are arranged in advance at different positions in a predetermined area and perform observation; and a data calculation device that performs calculation on the basis of a result observed by each of the plurality of observation devices, wherein the observation devices include a spectrum observation unit that observes a spectrum in a predetermined frequency range, a wireless communication unit that performs wireless communication in the predetermined frequency range, and a transmission unit that transmits a spectrum observed by the spectrum observation unit and packet information used by the wireless communication unit for wireless communication, to the data calculation device together with time information indicating a time corresponding to each of the observed spectrum and the packet information, and the data calculation device includes a reception unit that receives a spectrum and packet information from each of the plurality of observation devices together with time information, a synchronization processing unit that processes each of spectra received by the reception unit so as to synchronize the spectra based on time information of packet information corresponding to the spectra, and a determination unit that determines usage of a frequency in the predetermined area or the type of a wireless system transmitting a radio wave in the predetermined area, on the basis of each of the spectra processed to be synchronized by the synchronization processing unit.

A frequency state observation method according to one embodiment of the present invention includes: a spectrum observation step of observing a spectrum in a predetermined frequency range by a plurality of observation devices that are arranged in advance at different positions in a predetermined area; a wireless communication step of performing wireless communication in the predetermined frequency range; a transmission step of transmitting an observed spectrum and packet information used for wireless communication to a data calculation device together with time information indicating a time corresponding to each of the observed spectrum and the packet information; a reception step of receiving, by the data calculation device, the spectrum and packet information from each of the plurality of observation devices together with each of the time information; a synchronization processing step of processing each of spectra received by the data calculation device so as to synchronize the spectra based on time information of packet information corresponding to the spectra; and a determination step of determining usage of a frequency in the predetermined area or the type of a wireless system transmitting a radio wave in the predetermined area, on the basis of each of the spectra processed to be synchronized.

A data calculation device according to one embodiment of the present invention includes: a reception unit that receives a spectrum of a predetermined frequency range observed by a plurality of observation devices arranged in advance at different positions in a predetermined area, and packet information used for wireless communication within the predetermined frequency range, together with time information indicating a time corresponding to each of the observed spectrum and the packet information; a synchronization processing unit that processes each of spectra received by the reception unit so as to synchronize the spectra based on time information of packet information corresponding to the spectra; and a determination unit that determines usage of a frequency in the predetermined area or the type of a wireless system transmitting a radio wave in the predetermined area, on the basis of each of the spectra processed to be synchronized by the synchronization processing unit.

Advantageous Effects of Invention

According to the present invention, even if a plurality of wireless communication systems coexist in a predetermined area, the frequency state can be observed with high accuracy.

BRIEF DESCRIPTION OF DRAWINGS

FIG. 4(*b*) is a diagram showing a capture result and a scan result of a packet observed by the observation device, together with time. FIG. 4(*c*) is a diagram illustrating a result of synchronization processing performed by a synchronization processing unit.

DESCRIPTION OF EMBODIMENTS

Figure 1:
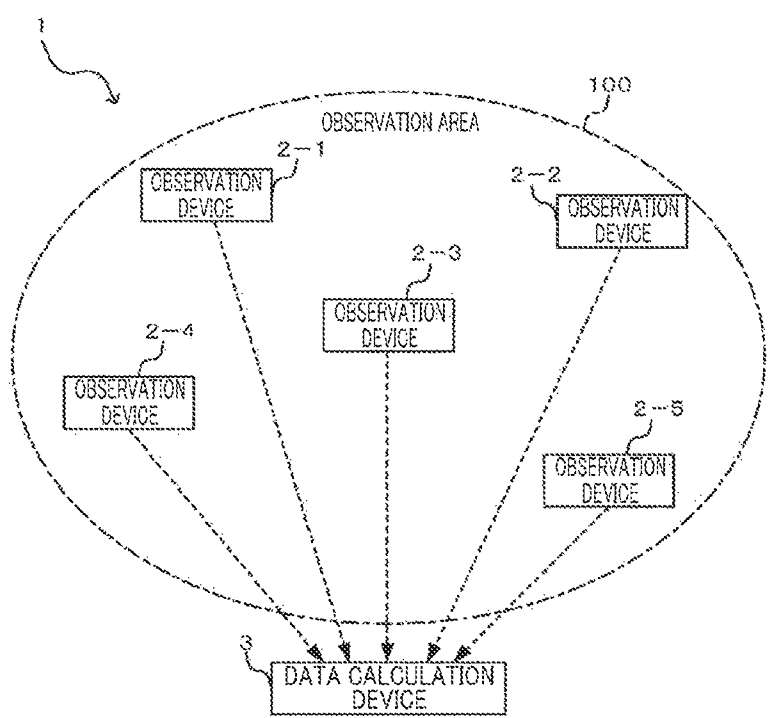
FIG. 1 is a diagram illustrating a configuration example of a frequency state observation system according to an embodiment.

A frequency state observation system 1 according to an embodiment will be described hereinafter using the drawings. FIG. 1 is a diagram illustrating a configuration example of the frequency state observation system 1 according to an embodiment.

As shown in FIG. 1, the frequency state observation system 1 according to one embodiment has, for example, a plurality of observation devices 2-1 to 2-5 that are arranged in advance at different positions in an observation area 100 and perform observation, and a data calculation device 3 that performs calculation based on the results observed by the respective observation devices 2-1 to 2-5.

In the observation area 100, it is assumed that a plurality of wireless communication systems including, for example, a wireless LAN, are performing wireless communication. Each wireless communication system is provided with a base station and a wireless terminal, not shown.

In addition, a basic bandwidth of each wireless communication system differs depending on the standard. For example, the bandwidth of 125 kHz is usually used for LoRa (one of the standards of LPWA (Low Power Wide Area)) and the bandwidth of 400 kHz is usually used for WiSUN (Wireless Smart Utility Network).

Hereinafter, in a case where one of a plurality of configurations such as the observation devices 2-1 to 2-5 is not specified, the observation devices are simply abbreviated as, for example, an observation device 2.

Figure 2:
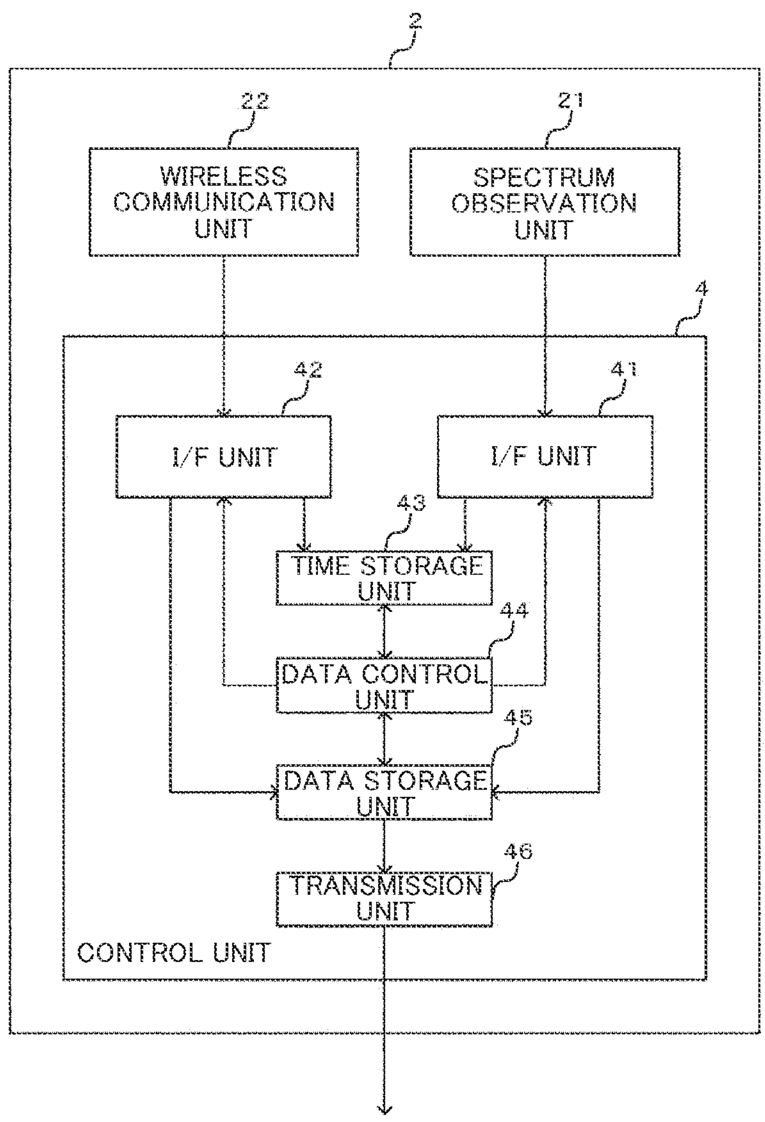
FIG. 2 is a functional block diagram illustrating functions that an observation device has.

FIG. 2 is a functional block diagram illustrating the functions of the observation device 2. As shown in FIG. 2, the observation device 2 includes, for example, a spectrum observation unit 21, a wireless communication unit 22, and a control unit 4.

The spectrum observation unit 21 scans and observes a spectrum in a predetermined frequency range, and outputs information indicating the observed spectrum to the control unit 4.

The wireless communication unit 22 performs wireless communication within the predetermined frequency range, and outputs a result (packet capture or the like) of the wireless communication to the control unit 4.

The control unit 4 includes an interface (I/F) unit 41, an interface (I/F) unit 42, a time storage unit 43, a data control unit 44, a data storage unit 45, and a transmission unit 46.

The I/F unit 41 is an interface for acquiring information indicating the spectrum observed by the spectrum observation unit 21. The I/F unit 42 is an interface for acquiring a result of wireless communication performed by the wireless communication unit 22.

The time storage unit 43 acquires and stores the time at which the spectrum observation unit 21 observes the spectrum, through the I/F unit 41. The time storage unit 43 acquires and stores a result of wireless communication performed by the wireless communication unit 22, via the I/F unit 42.

The data control unit 44 controls the respective units constituting the control unit 4. The data control unit 44 performs predetermined processing on data acquired from the spectrum observation unit 21 and the wireless communication unit 22.

A data storage unit 45 acquires and stores data of the spectrum observed by the spectrum observation unit 21 via the I/F unit 41. The data storage unit 45 acquires and stores data acquired through wireless communication performed by the wireless communication unit 22 via the I/F unit 42. The data storage unit 45 stores data processed by the data control unit 44 (packet information and the like to be described later).

The transmission unit 46 transmits the data processed by the data control unit 44 to the data calculation device 3 via the data storage unit 45. For example, the transmission unit 46 transmits the spectrum observed by the spectrum observation unit 21 and the packet information used for wireless communication by the wireless communication unit 22, to the data calculation device 3 together with time information indicating the time corresponding to the observed spectrum and the packet information.

Figure 3:
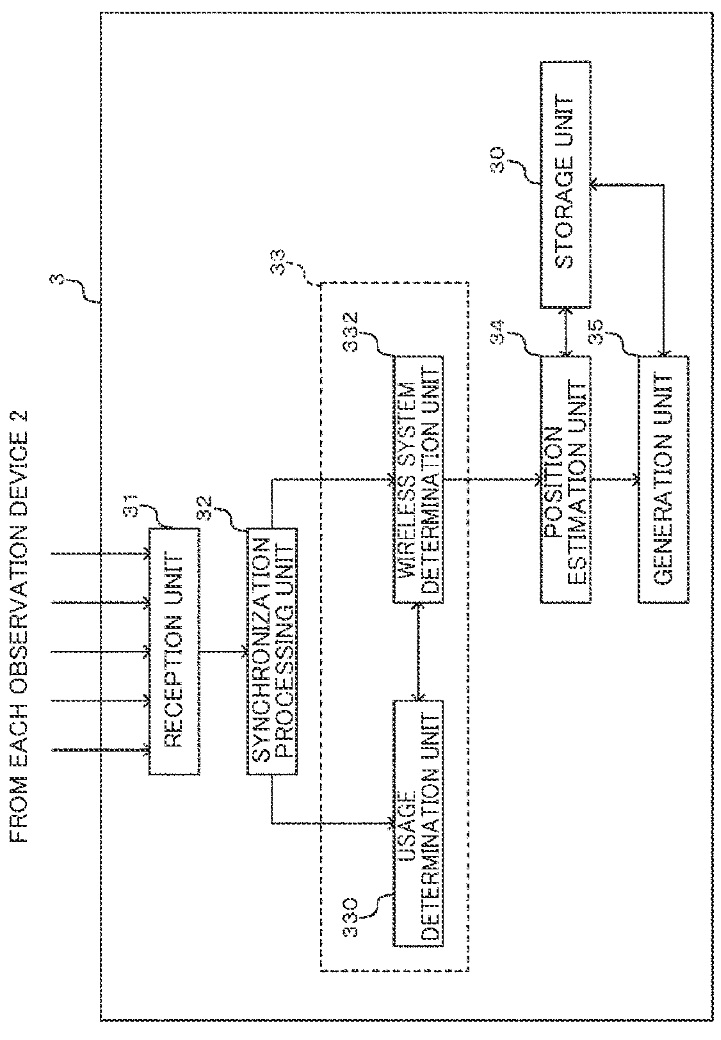
FIG. 3 is a functional block diagram illustrating functions that a data calculation device has.

FIG. 3 is a functional block diagram illustrating the functions of the data calculation device 3. As illustrated in FIG. 3, the data calculation device 3 includes a storage unit 30, a reception unit 31, a synchronization processing unit 32, a determination unit 33, a position estimation unit 34, and a generation unit 35.

The data calculation device 3 may be configured as an on-premise server or as a calculation resource on a cloud.

The storage unit 30 stores, for example, three-dimensional map information in the observation area 100 in advance. The storage unit 30 also stores a result of calculation performed by the data calculation device 3.

The reception unit 31 receives data transmitted by each of the observation devices 2-1 to 2-5 and outputs it to the synchronization processing unit 32. For example, the reception unit 31 receives a spectrum of a predetermined frequency range observed by each of the observation devices 2-1 to 2-5 and packet information used for wireless communication within the predetermined frequency range, together with time information indicating a time corresponding to the spectrum and the packet information.

The reception unit 31 may always receive data or periodically receive data.

The synchronization processing unit 32 processes data received by the reception unit 31 to time synchronize signals on the basis of, for example, a sequence number of a wireless LAN signal, and outputs the result to the determination unit 33. For example, the synchronization processing unit 32 processes each spectrum received by the reception unit 31 to synchronize it based on the time information of the packet information corresponding to that spectrum.

Figure 4:
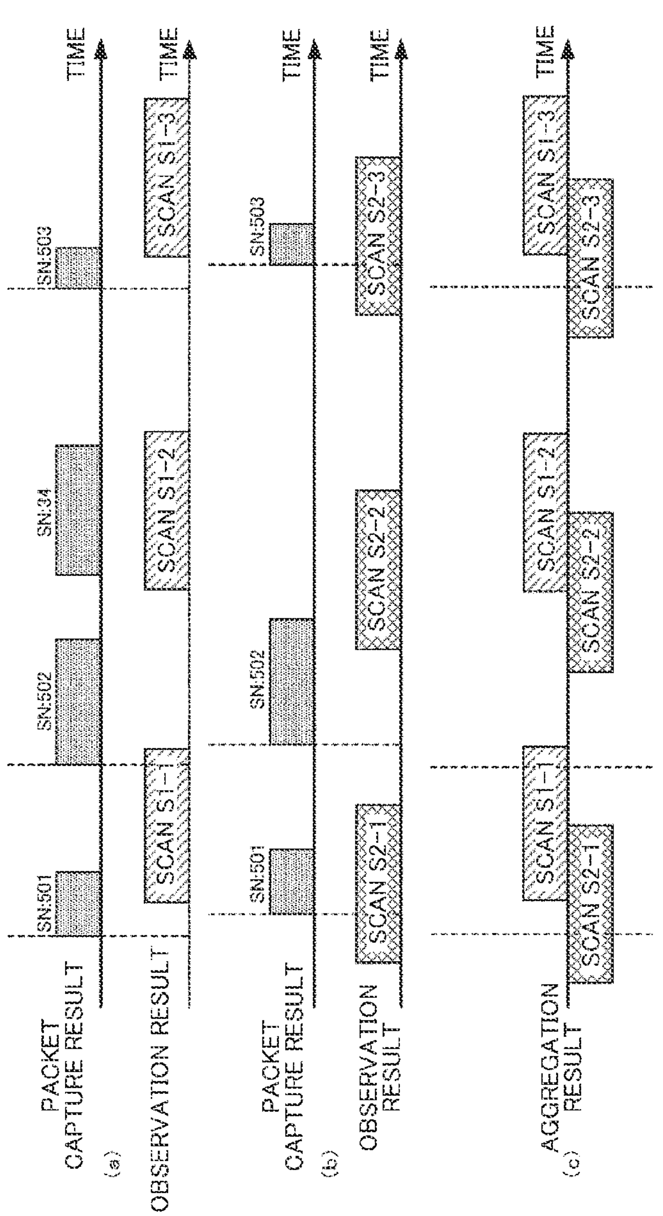
FIG. 4(*a*) is a diagram showing a capture result and a scan result of a packet observed by the observation device, together with time.

FIG. 4 is a diagram schematically showing an example of processing performed by the synchronization processing unit 32. FIG. 4(*a*) is a diagram showing a capture result of a packet observed by, for example, the observation device 2-1 and a scan result with time. FIG. 4(*b*) is a diagram showing a capture result of a packet observed by, for example, the observation device 2-2 and a scan result with time. FIG. 4(*c*) is a diagram illustrating a result of synchronization processing performed by the synchronization processing unit 32.

For example, the synchronization processing unit 32 arranges sequence numbers of packets transmitted from respective terminals of a plurality of wireless communication systems in the observation area 100 according to destinations, and compares packets from which the same terminal is a transmission source thereof.

Also, the synchronization processing unit 32 utilizes a plurality of other capture results even if some packets fail to be captured.

As shown in FIG. 4(*c*), the synchronization processing unit 32 synchronizes each scan result based on the timing (packet information) at which the packet is transmitted, to obtain an aggregation result.

When synchronizing the packet capture results based on the packet information, the synchronization processing unit 32 does not need to use the same channel as the spectrum observation unit 21.

For example, the spectrum observation unit 21 may observe 916 MHz to 920 MHz band, and the wireless communication unit 22 may capture a packet of a signal of 922 MHz to 923 MHz.

Then, the synchronization processing unit 32 synchronizes the spectrum (scan result) on the basis of the packet capture result, to make synchronization accuracy approximately equal to time accuracy of capture. For example, when the time accuracy of capture is within several msec, it is also possible to use the observation result of several tens msec signals as synchronization.

For example, if the observation area 100 is an area of several hundred square meters, several msec is considered to be an error range even if the delay time of the radio wave is taken into consideration. The synchronization range is within a range where the observation device 2 can perform the capture.

Thus, the synchronization processing unit 32 may synchronize the observation devices 2-1 to 2-5 by using the results (sequence numbers and capture results) obtained by respectively capturing the demodulated signals such as the wireless LAN signals by the wireless communication unit 22 with respect to the scan results of the plurality of spectrum observation units 21.

The determination unit 33 includes, for example, a usage determination unit 330 and a wireless system determination unit 332, performs predetermined determination, and outputs a determination result to the position estimation unit 34.

The usage determination unit 330 determines usage of a frequency in the observation area 100 on the basis of each spectrum processed to be synchronized by the synchronization processing unit 32, and outputs the usage to the wireless system determination unit 332.

The wireless system determination unit 332 determines the type of a wireless system transmitting radio waves in the observation area 100, on the basis of each spectrum processed to be synchronized by the synchronization processing unit 32 and a determination result obtained by the usage determination unit 330, and outputs the type to the position estimation unit 34.

The position estimation unit 34 estimates the positions of the wireless terminal and the base station for each wireless communication system in the observation area 100 on the basis of the determination result (the type of the wireless communication system) obtained by the wireless system determination unit 332, and outputs the estimation result to the storage unit 30 and the generation unit 35.

The position estimation unit 34 may estimate a signal arrival range of the wireless terminal on the basis of the estimated position of the wireless terminal and the radio wave intensity observed by the spectrum observation unit 21.

The position estimation unit 34 can also specify each of signal intensities that can be estimated to be transmitted from the same terminal, with respect to signal intensities in a plurality of synchronized scan results. Therefore, the position estimation unit 34 can estimate the distance between one terminal and each spectrum observation unit 21 from the intensity information of the signal transmitted from said terminal, so that the position of the terminal can be estimated from the observation results of three or more points (the principle of three-point positioning).

The position estimation unit 34 may also estimate the position of the terminal or the like by further utilizing beacon information or the like. In this case, the position estimation unit 34 can improve the position estimation accuracy by combining the scan result and the beacon information.

The generation unit 35 generates a propagation model of radio waves in the observation area 100 or the like on the basis of three-dimensional map information in the observation area 100 stored in the storage unit 30 and the estimation result (positions of the wireless terminal and the base station) of the position estimation unit 34, and stores the generated propagation model of radio waves in the storage unit 30.

That is, the generation unit 35 generates a propagation model, and can estimate a radio wave arrival direction from a synchronized observation result at a plurality of positions. The generation unit 35 may also generate the propagation model by using the reception intensity of the radio wave and GPS information.

In this manner, the frequency state observation system 1 determines the type of the wireless communication system of the observed spectrum from the bandwidth and signal time length of the radio signal predicted in the frequency band in the observation area 100, and estimates the terminal position from the determination result.

Since the length of the radio signal observed by the frequency state observation system 1 is within a fixed range, if, for example, the signal is a signal of a parameter of an electric power company, the signal length can be predicted to some extent from the contents of the radio frame. Therefore, it is also possible to determine the type of the wireless communication system according to the contents of the radio frame.

Thus, the frequency state observation system 1 according to one embodiment can observe the frequency state with high accuracy even if a plurality of wireless communication systems coexist in a predetermined area.

Since the frequency state observation system 1 observes characteristics (bandwidth and signal length) of the radio signal used in the observation area 100, the type of the radio signal or the like can be determined even when the radio signal cannot be demodulated.

Since the observation devices 2-1 to 2-5 are arranged in advance at a plurality of points in the frequency state observation system 1, observation at the same time can be performed, and it eliminates the need to take into account the time difference in the usage of radio waves at each observation point in the conventional method of moving observation.

Some or all of the functions of the data calculation device 3 and the control unit 4 may be configured with hardware such as a PLD (Programmable Logic Device) or a FPGA (Field Programmable Gate Array) or may be configured as a program that is executed by a processor such as a CPU.

For example, the data calculation device 3 and the control unit 4 can be realized using a computer and a program, and the program can be recorded on a storage medium or provided through a network.

Figure 5:
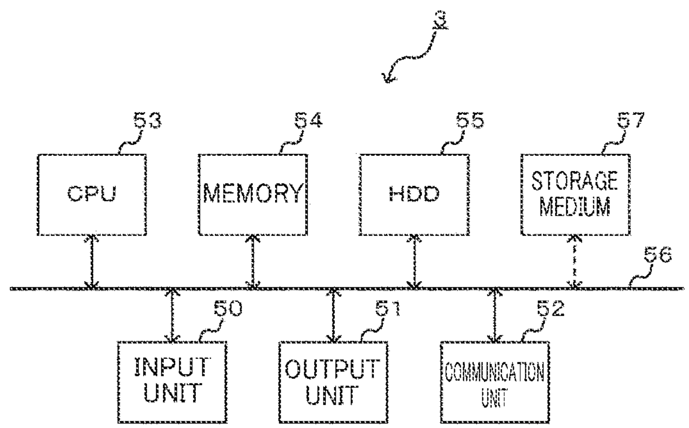
FIG. 5 is a diagram showing an example of a hardware configuration of a data calculation device according to an embodiment.

FIG. 5 is a diagram showing an example of a hardware configuration of the data calculation device 3 according to an embodiment. As shown in FIG. 5, for example, the data calculation device 3 has an input unit 50, an output unit 51, a communication unit 52, a CPU 53, a memory 54, and an HDD 55 connected via a bus 56, and functions as a computer. The data calculation device 3 is configured to be able to input/output data to/from a computer-readable storage medium 57.

The input unit 50 is, for example, a keyboard, a mouse, and the like. The output unit 51 is, for example, a display device such as a display. The communication unit 52 is, for example, a network interface.

The CPU 53 controls each unit constituting the data calculation device 3 and performs predetermined processing and the like. The memory 54 and the HDD 55 store data and the like.

The storage medium 57 is capable of storing a program or the like for executing the functions of the data calculation device 3. The architecture constituting the data calculation device 3 is not limited to the example shown in FIG. 5.

REFERENCE SIGNS LIST

1 Frequency state observation system
2-1 to 2-5 Observation device
3 Data calculation device
4 Control unit
21 Spectrum observation unit
22 Wireless communication unit
30 Storage unit
31 Reception unit
32 Synchronization processing unit
33 Determination unit
34 Position estimation unit
35 Generation unit
41 I/F unit
42 I/F unit
43 Time storage unit
44 Data control unit
45 Data storage unit
46 Transmission unit
50 Input unit
51 Output unit
52 Communication unit
53 CPU
54 Memory
55 HDD
56 Bus
57 Storage medium

The invention claimed is:

1. A frequency state observation system, comprising:

a plurality of observation devices that are arranged in advance at different positions in a predetermined area and perform observation; and a data calculation device that performs calculation on the basis of a result observed by each of the plurality of observation devices, wherein the observation devices include one or more processors configured to perform operations comprising:

observing a spectrum in a predetermined frequency range;

performing wireless communication in the predetermined frequency range; and transmitting the observed spectrum and packet information used in the wireless communication for wireless communication, to the data calculation device together with time information indicating a time corresponding to each of the observed spectrum and the packet information, and the data calculation device includes:

receiving a spectrum and packet information from each of the plurality of observation devices together with time information;

processing each of the received spectra so as to synchronize the spectra based on time information of packet information corresponding to the spectra; and determining usage of a frequency in the predetermined area or the type of a wireless communication system transmitting a radio wave in the predetermined area, on the basis of each of the spectra processed to be synchronized by the synchronization processing unit.

2. The frequency state observation system according to claim 1, wherein the operations further comprise: estimating a position of each of wireless terminals located in the predetermined area, on the basis of the type of the wireless communication system.

3. The frequency state observation system according to claim 2, wherein the operations further comprise:

storing three-dimensional map information in the predetermined area; and generating a propagation model of a radio wave in the predetermined area on the basis of the respective positions of the estimated wireless terminals and the three-dimensional map information.

4. A frequency state observation method, comprising:

observing a spectrum in a predetermined frequency range by a plurality of observation devices that are arranged in advance at different positions in a predetermined area;

performing wireless communication in the predetermined frequency range;

transmitting an observed spectrum and packet information used for wireless communication to a data calculation device together with time information indicating a time corresponding to each of the observed spectrum and the packet information;

receiving, by the data calculation device, the spectrum and packet information from each of the plurality of observation devices together with each of the time information;

processing each of spectra received by the data calculation device so as to synchronize the spectra based on time information of packet information corresponding to the spectra; and determining usage of a frequency in the predetermined area or the type of a wireless communication system transmitting a radio wave in the predetermined area, on the basis of each of the spectra processed to be synchronized.

5. The frequency state observation method according to claim 4, further comprising: estimating a position of each of wireless terminals located in the predetermined area, on the basis of the determined type of the wireless communication system.

6. The frequency state observation method according to claim 5, further comprising: generating a propagation model of a radio wave in the predetermined area on the basis of the respective estimated positions of the wireless terminals and three-dimensional map information in the predetermined area.

7. A data calculation device, comprising one or more processors configured to perform operations comprising:

receiving a spectrum of a predetermined frequency range observed by a plurality of observation devices arranged in advance at different positions in a predetermined area, and packet information used for wireless communication within the predetermined frequency range, together with time information indicating a time corresponding to each of the observed spectrum and the packet information;

processing each of the received spectra so as to synchronize the spectra based on time information of packet information corresponding to the spectra; and determining usage of a frequency in the predetermined area or the type of a wireless communication system transmitting a radio wave in the predetermined area, on the basis of each of the spectra processed to be synchronized by the synchronization processing unit.

8. The data calculation device according to claim 7, wherein the operations further comprise: estimating a position of each of wireless terminals located in the predetermined area, on the basis of the type of the wireless communication system.

* * * * *